United States Patent [19]
Turner

[11] 3,792,654
[45] Feb. 19, 1974

[54] COOKING AND SMOKING APPARATUS
[75] Inventor: Anthon H. Turner, Kingfisher, Okla.
[73] Assignee: Turnes Blackjack, Inc., Oklahoma City, Okla.
[22] Filed: Apr. 20, 1971
[21] Appl. No.: 135,626

[52] U.S. Cl.............. 99/427, 99/443 C, 99/447, 99/450, 99/481
[51] Int. Cl............... A23b 1/04, A47j 43/18
[58] Field of Search............. 99/267, 259–260, 99/262, 339, 421, 443–444, 446, 447; 126/25, 59.5

[56] References Cited
UNITED STATES PATENTS

| | | | |
|---|---|---|---|
| 1,964,372 | 6/1934 | Tygart | 99/259 UX |
| 2,748,691 | 6/1956 | Johnson | 99/444 |
| 3,568,590 | 3/1971 | Grice | 99/446 |
| 3,665,840 | 5/1972 | Horany | 99/261 |
| 2,790,380 | 4/1957 | Shryack | 99/261 |
| 3,379,119 | 4/1968 | Harrill | 99/421 H |
| 3,593,647 | 1/1969 | Copeland | 99/339 X |
| 3,498,211 | 3/1970 | Atkins | 99/443 C |
| 3,524,403 | 8/1970 | Treloar | 99/446 X |
| 3,256,803 | 6/1966 | Nelson | 99/443 C X |
| 3,491,679 | 1/1970 | Kelly | 99/443 C X |

Primary Examiner—Harvey C. Hornsby
Assistant Examiner—Arthur O. Henderson
Attorney, Agent, or Firm—Dunlap, Laney, Hessin & Dougherty

[57] ABSTRACT

The present invention relates to cooking and smoking apparatus of the general type which includes a substantially closed housing having an access door, means for supporting food materials such as meat and the like to be cooked and smoked within the housing and means for generating heat and smoke within the housing. By the present invention, a horizontal shaft is provided journaled within the housing having a pair of vertically positioned circular plates concentrically attached thereto. A plurality of perforated shelf members for supporting food materials to be cooked and smoked are positioned horizontally between the plates having the ends thereof rotatably attached to the plates at equidistant points around the peripheries thereof so that upon rotation of the shaft, the shelf members remain positioned horizontally and successively pass one above the other between an upper portion of the housing and a lower portion of the housing. Means for rotating the shaft are attached to the shaft and to the housing.

11 Claims, 5 Drawing Figures

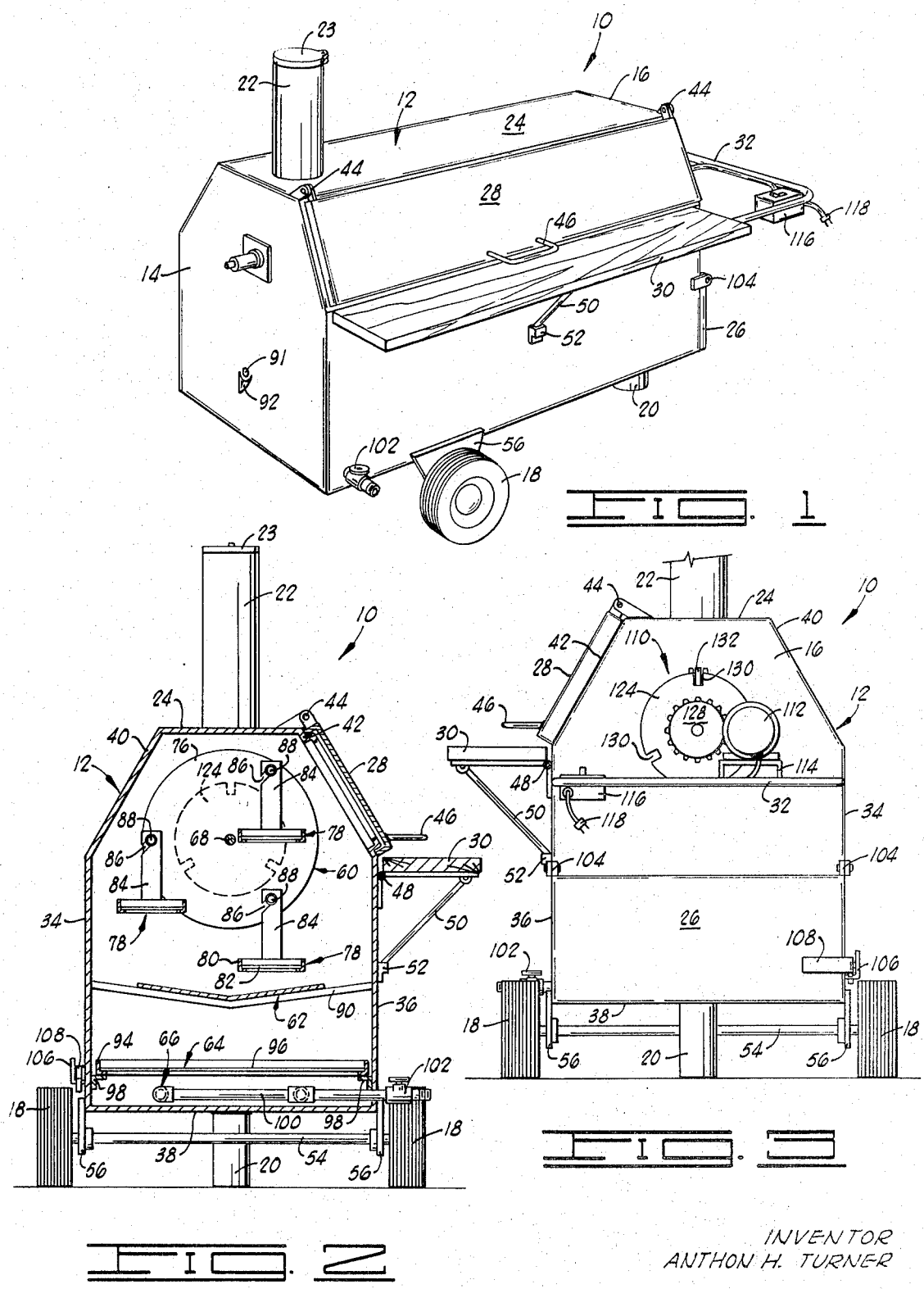

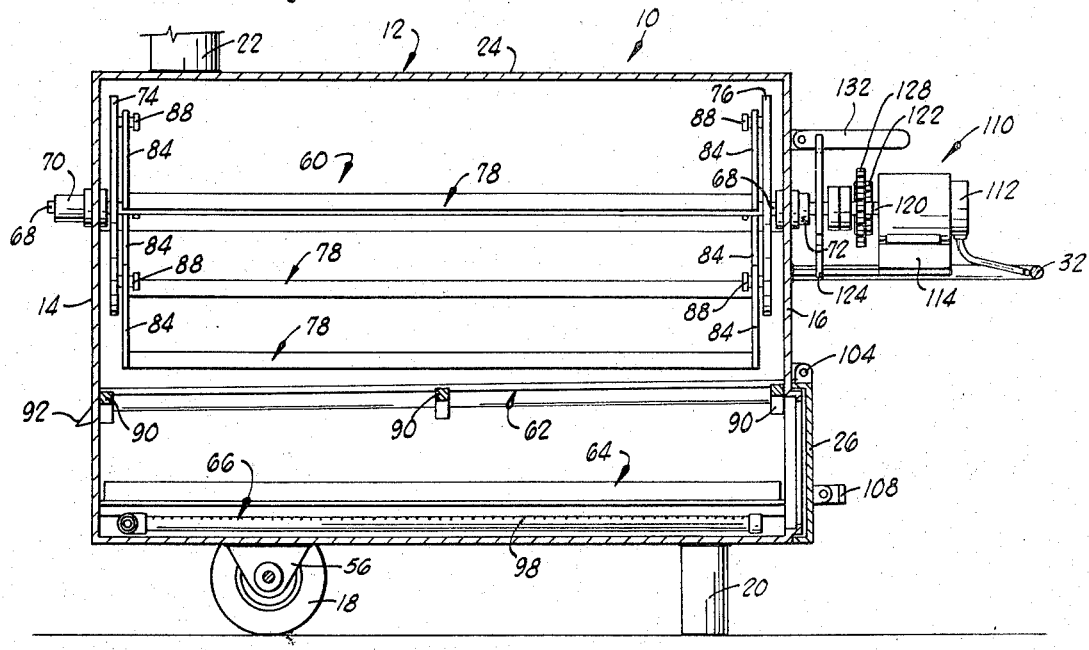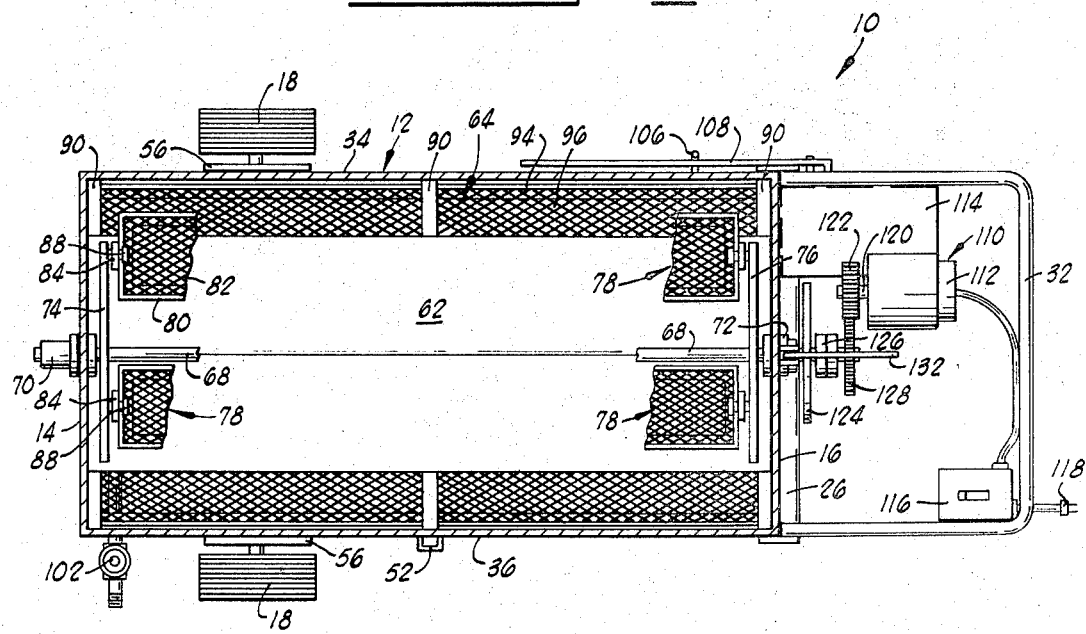

COOKING AND SMOKING APPARATUS

BACKGROUND OF THE INVENTION

1. Field of the Invention

The present invention relates to improved cooking and smoking apparatus, and more particularly, to cooking and smoking apparatus of the type which includes a substantially closed housing having an access door, means for supporting the food materials within the housing and means for generating heat and smoke within the housing.

2. Description of the Prior Art

Many various types of apparatus for cooking and smoking food materials, such as meat and the like, have been developed and used. Generally, these apparatus include a substantially closed housing having an access door therein, one or more grates disposed within the housing for supporting the materials to be cooked and means for combusting fuel or otherwise generating heat and smoke within the housing. These prior apparatus generally include one or more stationary grates for supporting the materials to be cooked positioned horizontally within the housing above the means for generating heat and smoke. In order to bring about the uniform exposure of the materials to the heat and smoke, they must be periodically turned by hand. Further, the apparatus suffer from the disadvantage that the juices from the cooking material pass through the supporting grates into the bottom portion of the housing, requiring the periodic hand basting of the materials and often causing excess flame to be generated within the housing.

Other types of cooking and smoking apparatus have been developed which include motor driven spits disposed within the housing above the source of heat and smoke. While food materials may be supported on the spits and rotated in a manner such that they are evenly cooked and smoked, the juices generated drip into the lower portion of the housing and hand basting is still required.

Thus, cooking and smoking apparatus used heretofore require hand basting and/or hand turning of the materials being cooked and smoked. By the present invention, a novel cooking and smoking apparatus is provided which brings about the uniform cooking and smoking of food materials as well as the basting thereof automatically, thereby obviating the necessity of periodic hand basting and turning of the materials.

SUMMARY OF THE INVENTION

The present invention relates to an improved cooking and smoking apparatus of the type which includes a substantially closed housing having an access door therein, means for supporting materials to be cooked and smoked within the housing and means for generating heat and smoke within the housing. By the present invention, a horizontal shaft is provided journaled within the housing having a pair of vertically positioned circular plates concentrically attached thereto. A plurality of perforated shelf members for supporting materials to be cooked and smoked are positioned horizontally between the plates having the ends thereof rotatably attached to the plates at equidistant points around the peripheries thereof so that upon rotation of the shaft, the shelf members remain positioned horizontally and successively pass one above the other between an upper portion of the housing and a lower portion of the housing. Means for rotating the shaft are attached to the shaft and to the housing.

It is, therefore, a general object of the present invention to provide an improved cooking and smoking apparatus.

A further object of the present invention is the provision of a cooking and smoking apparatus which automatically brings about the basting of food materials while cooking and does not require the periodic hand turning of the materials.

Yet a further object of the present invention is the provision of a cooking and smoking apparatus which brings about the uniform cooking and smoking of food materials in a minimum time with little or no personal attention required.

Other and further objects, features and advantages of the present invention will be apparent to those skilled in the art from the following description of presently preferred embodiments of the invention given for the purpose of disclosure.

BRIEF DESCRIPTION OF THE DRAWINGS

FIG. 1 is a perspective view of the improved cooking and smoking apparatus of the present invention, FIG. 2 is an end elevational view of the apparatus of FIG. 1 in section, FIG. 3 is an elevational view of the other end of the apparatus of FIG. 1, FIG. 4 is a side elevational view of the apparatus of FIG. 1 in section, and FIG. 5 is a top view of the apparatus of FIG. 1 in section.

DESCRIPTION OF THE PREFERRED EMBODIMENT

Referring to the drawings, and specifically to FIG. 1, the improved cooking and smoking apparatus of the present invention is shown in perspective and generally designated by the numeral 10. The apparatus 10 includes a housing 12 supported on a pair of wheels 18 and a post 20 having a pair of parallel ends 14 and 16. A stack 22 having a conventional draft control plate 23 attached thereto is attached to the top 24 of the housing 12, and a combination access and draft door 26 is disposed in the lower portion of the end 16 of the housing 12. An access door 28 is provided in the top portion of the housing 12 and a horizontal shelf 30 is attached to a side of the housing 12 adjacent to the access door 28. A bar 32 is attached to the end 16 of the housing 12 for providing a handle for lifting and moving the housing 12 on the wheels 18.

Referring now to FIG. 2, the apparatus of the present invention is illustrated in cross-section as viewed from the end 14 of the housing 12. The lower portion of the housing 12 includes a pair of parallel sides 34 and 36 and a bottom 38. The top portion of the housing 12 is trapazoidal in shape and is formed of a pair of inwardly sloping sides 40 and 42 connected to the sides 34 and 36 respectively, and to the horizontal top 24. The access door 28 is hinged to the top 24 by a pair of hinges 44 and a handle 46 is attached to the door 28. A horizontal shelf 30 is hingedly attached to the side 36 of the housing 12 by a plurality of conventional hinges 48. A support arm 50 having the upper end hingedly attached to the bottom of the shelf 30 is removably supported on a support member 52 attached to the side 36 of the housing 12. The wheels 18 are journaled on a shaft 54 which is in turn journaled in a pair of support members 56. The support members 56 are welded to the sides 34 and 36 of the housing 12.

Referring specifically to FIG. 2, a rotatable food supporting assembly 60, which will be described in detail hereinbelow, is disposed within the upper portion of the housing 12. A combination heat shield and liquid accumulator pan 62 is disposed in the housing 12 below the food supporting assembly 60, and a fuel support grate 64 is disposed within the housing 12 below the span 62. A conventional fuel gas burner assembly 66 is disposed within the housing 12 below the fuel support grate 64.

As may be seen in FIGS. 2, 4 and 5, the rotatable food supporting assembly 60 basically comprises a shaft 68 journaled in the ends 14 and 16 of the housing 12 by a pair of conventional bearing members 70 and 72. A pair of circular plates 74 and 76 are concentrically attached to the shaft 68. The circular plate 74 is positioned adjacent to the end 14 of the housing 12 in a plane perpendicular to the axis of the shaft 68. The circular plate 76 is positioned adjacent to the end 16 of the housing 12 in a plane parallel to the plane of the plate 74. A plurality of perforated shelf members generally designated by the numeral 78 are positioned horizontally between the circular plates 74 and 76 with the ends thereof rotatably attached to the plates 74 and 76 at equidistant points around the peripheries of the plates 74 and 76.

Referring still to FIGS. 2, 4 and 5, each of the shelf members 78 includes a rectangular frame 80 having parallel sides with a perforated plate or wire screen 82 attached thereto forming a horizontal perforated shelf for supporting food materials. Each of the shelf members 78 includes a pair of upstanding arms 84 having the lower ends thereof rigidly attached to the ends of the frame 80 at points coinciding with the axis of the frame 80. The upper end of each of the arms 84 includes an upwardly extending slot 86 positioned so as to form a hook therein. Each of the plates 74 and 76 includes a plurality of inwardly extending posts 88 positioned at equidistant points around the peripheries of the plates 74 and 76. The upper hook portions of the arms 84 of each of the shelf members 78 are hooked over two of the posts 88 so that each of the shelf members 78 hangs horizontally from and between the plates 74 and 76. Thus, it may be seen that as the shaft 68 and the plates 74 and 76 are rotated, the shelf members 78 are caused to move successively one over the other between the top portion of the housing 12 near the bottom portion of the housing 12 while remaining in a horizontal position.

The heat shield and liquid accumulator pan 62 is rectangular in shape when viewed from the top and V-shaped when viewed from an end. The pan 62 is preferably formed of sheet metal and is attached within the housing 12 by means of a plurality of bars 90 the ends of which are welded to the internal surfaces of the sides 34 and 36 of the housing 12. As is best shown in FIGS. 4 and 5, the pan 62 is of a length such that the ends thereof contact the internal surfaces of the ends 14 and 16 of the housing 12. However the width of the pan 62 is such that space is provided between the sides of the pan 62 and the internal surfaces of the sides 34 and 36 of the housing 12 when viewed from the top. Further, as shown in FIG. 4, the pan 62 is positioned in the housing 12 so that it slopes downwardly from the end 16 to the end 14 of the housing 12. An aperture 91 (FIG. 1) is positioned in the end 14 of the housing 12 such that liquids draining from the pan 62 pass through the aperture to outside the housing 12. A spout 92 is provided attached to the external surface of the end 14 of the housing 12 beneath the aperture 92 to direct the liquids into a suitable container (not shown).

The fuel supporting grate 64 includes a rectangular frame 94 formed of angle iron or other suitable material having a horizontally positioned perforated plate or wire screen 96 welded thereto. The grate 64 is removably supported on a pair of angles 98 welded to the internal surfaces of the sides 34 and 36 of the housing 12.

A conventional fuel gas burner assembly 66 is disposed beneath the grate 64 comprised of one or more horizontally extended perforated pipes 98 connected to a header 100. The header 100 extends through the side 36 of the housing 12, and a conventional shut-off valve 102 is connected thereto.

The access door 26 is hingedly connected to the bottom portion of the end 16 of the housing 12 by a pair of conventional hinges 104. The access door 26 provides access to the fuel supporting grate 64 and fuel gas burner assembly 66, and also functions as a control door for draft through the housing 12. As shown in FIGS. 2 through 5, a ratchet arm 108 is hingedly attached to the door 26 which cooperates with a detend 106 attached to the side 34 of the housing 12. The ratchet arm 108 may be engaged with the detent 106 in various portions allowing the door 26 to be held open desired distances.

Referring now specifically to FIGS. 3 through 5, a drive mechanism generally designated by the numeral 110 is attached to the end 16 of the housing 12 and to the shaft 68 for rotating the shaft 68. The assembly 110 basically comprises a conventional electric motor 112 attached to the end 16 of the housing 12 by a support member 114. An on-off switch 116 is provided attached to the bar 32 and connected to the electric motor 112 by conventional wiring. A recepticle 118 is provided connected to the switch 116 to which an electric extension cord may be attached for providing electric power to the switch 116 and electric motor 112. The output shaft 120 of the electric motor 112 includes a conventional gear 122 connected thereto. The end of the shaft 68 passing through the bearing 72 attached to the end 16 of the housing 12 includes a circular plate 124 and a conventional slip clutch assembly 126 attached thereto. The slip clutch assembly 126 is attached to a conventional gear 128 which is positioned in mated engagement with the gear 122. The plate 124 is concentrically attached to the shaft 68 and includes a plurality of notches 130 (FIG. 3) positioned in the outer periphery thereof. An arm 132 is hingedly attached to the end 16 of the housing 12 and is positioned for manual engagement in the notches 130 of the plate 124. As will be understood, a variety of drive arrangements between the shaft 68 and the electric motor 112 may be utilized, such as a chain drive, etc.

OPERATION

In operation of the cooking and smoking apparatus 10 of the present invention, fuel for generating heat and smoke, such as wood, etc., is placed on the fuel supporting grate 64 by way of the access door 26. The fuel gas burner assembly 66 is operably attached to a source of fuel gas such as natural gas, propane or butane. The valve 102 is opened allowing the gas to pass from the header 100 into the pipes 98 and through apertures contained therein. The fuel gas is ignited which in turn causes the fuel supported on the grate 64 to be ignited. As will be understood, the apparatus 10 may or may not include the fuel gas burner assembly 66, but if included, fuel gas may be burned only for an initial period of time until the fuel supported on the grate 64 has been ignited and then shut off, or alternatively, the fuel gas may be burned throughout the cooking and smoking operation if desired. Once ignited, the smoke and flames from the burning fuel supported on the grate 64 pass upwardly in the housing 12 and the smoke exits the housing 12 by way of the stack 22. The door 26 and draft control plate 23 attached to the stack 22 are adjusted such that the maximum quantity of smoke is circulated through the housing 12 and the desired temperature is maintained therein. The pan 62 functions to shield the food materials supported on the shelf member 78 from flames generated from the fuel. That is, the flames are diverted by the bottom surface of the pan 62 outwardly towards the sides 34 and 36 of the housing 12 so that the flame is largely confined within the lower portion of the housing 12 below the pan 62, and prevented from directly contacting the food materials being cooked and smoked. The smoke generated from the fuel combustion passes upwardly between the sides of the pan 62 and the sides 34 and 36 of the housing 12 into the upper portion of the housing 12.

Food materials to be cooked and smoked are placed on the shelf members 78 by way of the access door 28. That is, the electric motor 112 is started which causes the gear 128, slip clutch assembly 126, plate 124, shaft 68 and shelf members 78 to be rotated. The arm 132 is lowered to the horizontal position (as shown in FIGS. 3, 4 and 5) and caused to slip into one of the notches 130 disposed in the plate 124. As will be apparent, when the arm 132 is positioned in one of the notches 130, the circular plate 124 and the shaft 68 is prevented from rotating. However, the slip clutch assembly 126 allows the electric motor and gears 122 and 128 to continue rotating. The notches 130 are provided in the circular plate 124 equal in number to the number of shelf members 78, and are positioned in the plate 124 with respect to the shaft 68 and shelf members 78 so that when the arm 132 is positioned within one of the notches 130, one of the shelf members 78 is positioned adjacent to the access door 28 of the housing 12.

Food materials to be cooked and smoked are placed on each of the shelf members 78 by stopping and staring the movement of the shelf members 78 using the arm 132. When food products have been placed on each of the shelf members, the arm 132 is raised allowing the shaft 68 to continuously rotate which in turn causes the shelf members to be successively moved one over the other between the top portion of the housing 12 and the bottom portion thereof. As the food materials on the shelf members 78 are cooked, juices generated therefrom pass through the perforated bottom portions of the shelf members. Because of the movement of the shelf members one over the other, juices generated from the cooking food materials contained on each shelf member are caused to drop onto the food materials contained on a lower shelf member. Thus, it may be seen that by the apparatus of the present invention, basting of the food materials supported on the shelf members 78 takes place automatically within the apparatus 10 as the food materials are cooked and smoked.

Further, because the food materials supported on each of the shelf members 78 are constantly moved from the top portion of the housing 12 to near the bottom portion thereof, that is, from a position a distance away from the flames and heat generated in the bottom portion of the housing 12 to a position adjacent to the flames and heat, the food materials supported on the shelf members 78 are thoroughly and uniformly cooked without the necessity of hand turning. A further advantage of the present invention is that since the top portion of the housing 12 is cooler than the bottom portion, water vapor generated by the combustion of the fuel is condensed on the inside surfaces of the top portion of the housing. This condensed water drips down onto the food materials supported on the shelf members 78 contributing to the basting of the food materials and causing the food materials to be empregnated with a desirable smoke taste. Excess liquids generated by the cooking food materials and the condensation of water vapor drip from the top portion of the housing member 12 and from the shelf members 78 onto the pan 62. Due to the slope and V-shape of the pan 62, the liquids accumulating thereon drain to the end of the pan adjacent the end 14 of the housing 12 and pass through the aperture 91 contained therein and over the spout 92. A suitable container (not shown) is placed under the spout 92 for collecting the excess liquids.

Upon completion of the cooking and smoking process, the arm 32 is lowered to fit within one of the notches 130 thereby stopping the rotation of the shelf members 78 with one of the shelf members positioned adjacent to the access door 28. The cooked and smoked food materials are removed from the shelf members 78 as each of the shelf members 78 is alternatingly caused to move to a position adjacent the access door 28. The electric motor 112 is then shut off and the combustion of fuel terminated.

As will be understood, the shelf 30 is utilized for supporting cooked or uncooked food materials throughout the cooking process. The access door 28 may be opened fully in order to load fuel onto the grate 64 or to clean out the bottom portion of the housing 12. Further, the grate 64 may be moved outwardly through the access door 26 on the angles 98 to facilitate loading fuel on the grate 64.

Thus, it may be seen that the improved cooking and smoking apparatus of the present invention is well adapted to carry out the objects and attain the ends and advantages mentioned as well as those inherent therein. While presently preferred embodiments of the invention are given for the purpose of disclosure, numerous changes and arrangement of parts may be made which will readily suggest themselves to those skilled in the art and which are encompassed within the spirit of the invention disclosed herein.

What is claimed is:

1. A cooking and smoking apparatus which comprises:
   a housing having an upper and a lower portion, sides and ends and an aperture formed
   through a lower end portion thereof;
   a plurality of perforated shelf members supporting materials to be cooked and smoked disposed and supported generally within the upper portion of the housing;

means generating heat and smoke disposed generally within the lower portion of the housing; and a V-shaped pan, having opposite ends, disposed generally between the perforated shelf members and the means generating the heat and smoke and supported beneath the perforated shelf members and receiving the liquids from the materials being smoked and cooked, one end of the pan connected to the housing near the aperture in the housing and the pan supported in the housing sloping downwardly from one end thereof toward the end thereof connected to the housing near the aperture in the housing causing the liquids accumulating on the pan to drain through the aperture in the housing, the pan shielding the generated heat from the materials being cooked and directing the generated heat and smoke between the pan and the housing.

2. The apparatus of claim 1 wherein said pan is rectangular in shape when viewed from the top with the ends thereof attached to the ends of said housing and with the sides thereof positioned inwardly from the sides of said housing so that heat and smoke generated in the bottom of said housing freely travel upwardly between the sides of said housing and the sides of said pan.

3. The apparatus of claim 2 wherein said housing is substantially closed and includes a smoke stack attached to the top portion thereof.

4. The apparatus of claim 3 wherein said means for generating heat and smoke includes:

a draft and access door positioned in the bottom portion of one end of said housing; and a horizontal grate removably disposed in the bottom of said housing for supporting fuel thereon.

5. The apparatus of claim 4 which is further characterized to include a gas burner positioned within said housing beneath said grate and arranged to be connected to a source of fuel gas.

6. A cooking and smoking apparatus which comprises:

a housing having an upper and a lower portion, sides and ends and an aperture formed through a lower portion of one of the ends of the housing;

a plurality of perforated shelf members supporting materials to be cooked and smoked disposed and supported generally within the upper portion of the housing;

means generating heat and smoke disposed generally within the lower portion of the housing; and a pan having opposite ends, each of the opposite ends connected to one of the ends of the housing and the pan disposed generally between the perforated shelf members and the means generating the heat and smoke, the pan supported beneath the perforated shelf members and receiving liquids from the materials being smoked and cooked, the aperture in the housing being in communication with the portions of the pan receiving the liquids, the liquids received via the pan being drained from the housing via the aperture, the pan shielding the generated heat from the materials being cooked and directing the generated heat and smoke between the pan and the housing.

7. A cooking and smoking apparatus which comprises:

a housing having an upper and a lower end portion, sides and ends and an aperture formed through a lower end portion thereof;

a shaft disposed horizontally within the housing journaled between the ends of the housing;

a pair of circular plates concentrically attached to the shaft, each of the plates positioned in a plane generally perpendicular to the axis of the shaft and generally adjacent one end of the housing;

means connected to the shaft and rotating the shaft within the housing;

a plurality of perforated shelf members supporting materials to be cooked and smoked disposed and supported generally within the upper portion of the housing, the perforated shelf members being horizontally supported between the plates and each shelf member being rotatably attached to the plates at equidistant points generally about the peripheries of the plates so that the shelf members remain positioned horizontally and pass one over the other between the upper portion and the lower portion of the housing upon rotation of the shaft; and a pan connected to the housing and disposed generally between the perforated shelf members and the means generating the heat and smoke, the pan supported beneath the perforated shelf members and receiving liquids from the materials being smoked and cooked and having a portion connected to the housing near the aperture in the housing draining the liquids from the housing via the aperture, the pan shielding the generated heat from the materials being cooked and directing the generated heat and smoke between the pan and the housing.

8. The apparatus of claim 7 which is further characterized to include means for stopping the rotation of said shaft and locking said shaft in selected positions whereby each of said shelf members may be caused to be adjacent to said access door in said housing.

9. The apparatus of claim 7 wherein the pan is further characterized as being generally horizontally disposed in the housing between the lowermost position of the shelf members and the means for generating heat and smoke.

10. The apparatus of claim 7 wherein the plates are each defined further to include a plurality of inwardly extending posts formed thereon; and wherein each of the perforated shelf members include an upstanding arm formed on each end thereof, an upwardly extending slot being formed through a portion of each of the upstanding arms, each upwardly extending slot being removably attachable to one of the inwardly extending posts formed on one of the plates.

11. A cooking and smoking apparatus which comprises:

a housing having an upper and lower portion, sides and ends;

a shaft disposed horizontally within the housing and journaled in the ends of the housing;

a pair of plates attached to the shaft;

a plurality of perforated shelf members for supporting the materials to be cooked and smoked within the housing positioned horizontally between the plates and having the ends thereof rotatably attached to the plates so that the shelf members remain positioned horizontally and pass one over the other between the upper portion and the lower portion of the housing upon rotation of the shaft;

means connected to the shaft rotating the shaft;

means generating heat and smoke disposed generally within the lower portion of the housing;

pan means supported within the housing disposed generally between the perforated shelf members and the means generating heat and smoke, the pan means having a portion receiving liquids from the materials being smoked and cooked and draining the liquids from the housing and a portion shielding the generated heat from the materials being cooked and directing the generated heat and smoke between the pan means and the housing;

access door means formed through a portion of the housing; and means stopping the rotation of the shaft and locking the shaft in selected positions positioning each of the perforated shelf members generally adjacent the access door means formed through a portion of the housing.

* * * * *